US005580459A

United States Patent [19]

Powers et al.

[11] Patent Number: 5,580,459
[45] Date of Patent: Dec. 3, 1996

[54] FILTRATION STRUCTURES OF WET LAID, BICOMPONENT FIBER

[75] Inventors: Edward J. Powers; Steve F. Nielsen; Jeanne E. Smith, all of Charlotte, N.C.; Theodore S. Thornburg, Rock Hill, S.C.

[73] Assignee: Hoechst Celanese Corporation, Somerville, N.J.

[21] Appl. No.: 999,031

[22] Filed: Dec. 31, 1992

[51] Int. Cl.$^6$ .............................. B01D 11/00; B01D 29/00
[52] U.S. Cl. .................. 210/634; 210/490; 210/500.1; 210/500.26; 210/503; 210/509; 55/211; 55/527; 428/283; 428/288; 428/297; 162/146
[58] Field of Search .................................. 210/500.1, 503, 210/500.26, 509, 508, 490, 505, 634; 55/527, 524, 211; 162/146, 157.5; 428/288, 297, 441, 397, 283; 604/376

[56] References Cited

U.S. PATENT DOCUMENTS 4,765,812  8/1988  Homonoff et al. .................... 55/524

Primary Examiner—Frank Spear
Assistant Examiner—Ana M. Fortuna
Attorney, Agent, or Firm—P. P. McCann

[57] ABSTRACT

A filtration structure comprising a thermally bonded, wet laid, fibrous web and support is provided. The web is formed from bicomponent fiber comprising a structure-forming component and a heat-bondable component. Also provided is a filtration method using the filtration structure. Beneficially, the filtration structure may include microfiber.

7 Claims, 4 Drawing Sheets

5,580,459

FILTRATION STRUCTURES OF WET LAID, BICOMPONENT FIBER

FIELD OF THE INVENTION

This invention relates to wet laid, filtration structures.

BACKGROUND OF THE INVENTION

Commercially available filters remove particulates from many different types of liquids and gases. Particulates are removed from machining lubricants, coolants, engine oil and so forth. Particulates are removed from stack gases, from air cycled through heating and air conditioning systems, and from air before the air is combined with a fuel for combustion in engines.

Filler structures are characterized by an inverse relationship between filter efficiency and porosity. A filter structure having an improved ratio of filter efficiency to porosity would beneficially result in a higher flow rate at a given filtration efficiency and among other things, reduce power consumption compared to traditional filter structures.

As illustrated by U.S. Pat. No. 5,057,368, high loft filters of high efficiency may be formed from trilobal or quadrilobal fiber. The fiber polymer may be a blend of polyester and polyolefin.

As exemplified by *Filtration News*, pp. FN 32–33 (Sept./Oct. 1989), wet laid, filter media are known. Compared to spunbonded and dry laid products, improved uniformity has been observed for the wet laid products. The relationship between fiber diameter, filter efficiency and porosity for the homofil webs investigated therein, is illustrated in the graph lines (Homofil Webs) of FIGS. 1 to 3 attached hereto.

Generally speaking, high efficiency filters formed from microfiber, typically 0.25 micron microglass, are relatively expensive. A less costly, high efficiency filter would be advantageous. Also, it would be beneficial to be able to control filter pore size in a cost-efficient manner with commercially available materials.

Dry processes of making nonwoven fabrics from a blend of bicomponent fiber and natural or synthetic fiber are exemplified by European Patent Application No. 0 070 164 to Fakete et al, which discloses a low density, thermobonded, nonwoven fabric comprising staple length polyester/polyethylene bicomponent fiber and short length natural cellulose fiber. The thermal bonding is at a temperature sufficient to fuse the polyethylene component without fusing the polyester component, while the web is maintained under little or no compression.

As illustrated by U.S. Pat. No. No. 5,167,765 and European Patent Application No. 0 311 860, heat-bonded, wet laid structures may be made from bicomponent fiber and optionally an additional fiber type. An exemplary bicomponent fiber for this purpose, is available under the registered trade mark CELBOND® from Hoechst Celanese Corporation of Charlotte, N.C. This bicomponent fiber consists of a polyester web-forming core and a low melting sheath, and is also available as crimped fiber for dry lay applications.

As indicated, an improved ratio of filtration efficiency to porosity and improved control of porosity are desirable. Accordingly, there is a need for an improved filtration structure characterized by a higher flow rate at a given filtration efficiency. Moreover, there is a need for a filtration structure that may be customized to a wide range of filtration efficiencies/porosities at reasonable cost.

SUMMARY OF THE INVENTION

In accordance with the present invention, an improved filtration structure is advantageously based upon a bicomponent fiber matrix. In this regard, this invention is based upon the discovery that a thermally bonded, wet laid, fibrous web comprising a bicomponent fiber matrix has an improved ratio of filtration efficiency to porosity. The bicomponent fiber includes a structure-forming component and a heat-bondable component. By contrast, conventional filter structures rely on adhesive additives that may plug filter pores.

In one aspect, the bicomponent fiber matrix is provided with a filtration support structure. In another aspect, a filtration structure in accordance with the present invention, advantageously includes microfiber bonded to the bicomponent fiber matrix to form a heterofiber matrix. Also provided is a filtration method using the filtration structure of the present invention.

According to the present invention, filtration structures may be customized to a desired filter efficiency by using microfiber to control pore size of the bicomponent fiber matrix. Beneficially, the microfiber is generally uniformly distributed throughout the matrix. The heterofiber matrix may in certain cases be provided with a filtration support structure.

BRIEF DESCRIPTION OF THE DRAWING

Reference is now made to the accompanying drawing, which forms a part of the specification of the present invention.

DETAILED DESCRIPTION OF THE INVENTION

Figure 1:
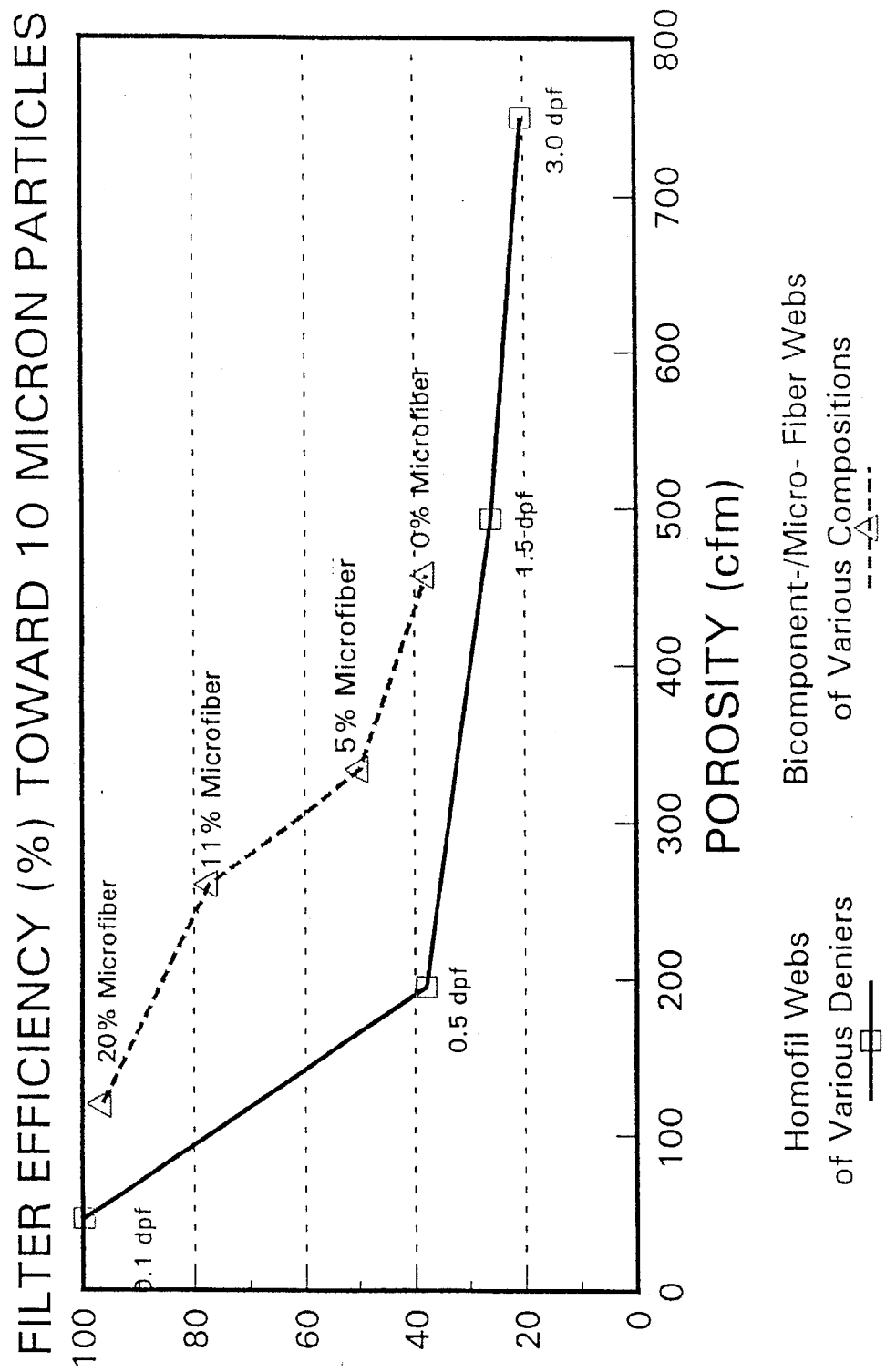
FIGS. 1–3 illustrate the relationship between filter efficiency and porosity, for filtration structures in accordance with the present invention and conventional homofil webs.

As indicated above, the improved filtration structure of the present invention is advantageously based upon a bicomponent fiber matrix. Useful bicomponent fibers suitable for forming a fibrous filter matrix, are described in U.S. Pat. No. 5,167,765, the pertinent disclosure of which is hereby incorporated herein by reference. Other useful bicomponent fibers include those described in European Patent Applications Nos. 0 070 164 and 0 311 860, discussed previously.

Polyesters are particularly useful as a web structure-forming component of a suitable bicomponent fiber. However, other web structure-forming polymers having a substantially higher melting point than the heat-bondable component of the bicomponent fiber, may be used. Generally speaking, the web structure-forming component has a melting point beneficially at least about 30° C. higher than that of the heat-bondable component.

As indicated, also forming a useful bicomponent fiber is a heat-bondable component. This component provides for bonding to form a self-bonded, structural matrix upon the application of heat to the bicomponent fiber. Particularly preferred is a heat-bondable component that has adequate melt flow for strong bonding, in particular strong physical bonding, at elevated temperatures above its melting point. When the filtration structure includes a microfiber component, as hereinafter discussed, the heat-bondable component may be selected to optimize bonding to the microfiber.

An exemplary heat-bondable component is a linear low density polyethylene (LLDPE). Such a polymer is termed "linear" because of the substantial absence of branched chains of polymerized monomeric units pendant from the main polymer "backbone". The linear polymer may be the copolymer of ethylene and minor amounts of alkenes having from about 3 to 12 carbons per alkene molecule, preferably about 4 to 8 carbons. In such case, the amount of the alkene comonomer is generally sufficient to provide the polymer with a density substantially in the density range of LDPE, due to alkyl sidechains on the polymer; nevertheless, the polymer remains in the "linear" classification and the polymer is conveniently referred to as a linear low density polyethylene.

A useful LLDPE polymer may have a density in the range of about 0.88 to 0.945 g/cc, preferably about 0.90 to 0.94 g/cc. The density will depend, in large part, on the particular alkene comonomer(s) selected. A particularly useful alkene is 1-octene. The alkene(s) may constitute about 0.5 to 35 wt. % of the copolymer, preferably about 1 to 20 wt. %, most preferably about 1 to 10 wt. %.

A useful LLDPE polymer may have a melt flow value (MFV) in the range of about 5 to 200 gm/10 min as measured in accordance with ASTM D-1238(E) at 190° C. The melt flow value is preferably in the range of about 7 to 120 gm/10 min, most preferably about 10 to 105 gm/10 min. Melt flow value is inversely related to molecular weight.

A useful LLDPE polymer may further include a grafted high density polyethylene (HDPE), in a blend with the LLDPE. Illustratively, the HDPE has been grafted with maleic acid or maleic anhydride, to provide succinic acid or succinic anhydride groups grafted along the HDPE polymer chain. Fumaric acid and other conjugated, unsaturated acids may alternatively be used. A useful HDPE for making a grafted HDPE in accordance with the present invention, has a melt flow value in the range of about 5 to 500 g/10 min according to ASTM D-1238(E) at 190° C., and a density in the range of about 0.94 to 0.965 g/cc, preferably a MFV of about 7 to 150 g/10 min and a density of about 0.945 to 0.960 g/cc. The anhydride or acid groups generally comprise about 0.0001 to 10 wt. %, preferably about 0.01 to 5 wt. %, of the HDPE.

The grafted HDPE may be blended as desired with LLDPE to produce the blends useful as the heat-bondable component. The ratio of grafted HDPE/LLDPE in the blend is in the range of about 2/98 to about 30/70, preferably about 5/95 to about 20/80.

Other polymers useful as the heat-bondable component are known. Illustrative are certain polyamides and polyester copolymers having a significantly lower melting point than the web structure-forming component.

The bicomponent fiber may have a sheath/core or side-by-side configuration. The bicomponent fiber may be eccentric or concentric. Also useful is multi-segmented bicomponent fiber. Helical (self-crimped, eccentric bicomponent) or crimped (slightly crimped, or crimped to a certain specification) bicomponent fiber may beneficially form a loftier structure having a more tortuous flow path, thereby providing further enhanced porosity for a given filter efficiency.

Useful bicomponent fiber generally has a length to diameter ratio of between about 50:1 and about 2000:1, suitably between about 100:1 and about 500:1. The length is generally about 1 to 75 mm, preferably about 2 to 20 mm ("short cut"), and the denier is typically from about 0.5 to 50 dpf, conveniently from about 5 to 30 microns. Bicomponent fibers of different diameter may be used to form the structural matrix.

For illustration purposes, a short cut, bicomponent fiber having a diameter of about 15 microns may form pores of about 100 microns across. The pore size selected will vary depending on the intended application. See the *Filtration News* reference, earlier discussed, for illustrative information relating fiber diameter to pore size.

As explained, a filtration structure in accordance with the present invention, is advantageously based upon a self-bonded, bicomponent fiber matrix. However, the filtration structure may further beneficially include suitable microfiber bonded to the bicomponent fiber matrix. In this regard, it has been found that the microfiber may be used to customize the porosity of the bicomponent fiber matrix. Average pore size may be adjusted by varying the level or diameter of the microfiber. Moreover, it has been found that a heterofiber matrix formed from the bicomponent fiber and the microfiber has an improved ratio of filtration efficiency to porosity.

The microfiber may, generally speaking, be any fiber of small diameter, typically less than 2 microns. It may be, for example, a glass microfiber, a polymeric microfiber such as a bicomponent polymeric microfiber, or a mineral microfiber. A mixture of microfiber types may be used. Any microfibers having sufficiently high modulus to be discrete pore-spanning elements, rather than entangling with one another, should beneficially perform.

Particularly suitable microfiber has a diameter of about 0.8 to 1 micron or less. Microfiber of relatively smaller diameter may produce a relatively greater ratio of filtration efficiency to porosity. Useful commercially available microfiber includes fiberglass of 0.25 micron diameter. A diameter of about 0.1 micron is, generally speaking, a lower practical limit with current technology. Microfibers of different diameters may be combined. The length of the microfiber should be sufficient to span the pores of the bicomponent fiber matrix.

Suitability of a particular microfiber depends in part upon the end use intended for the filtration structure. Microfiber other than glass may be preferred in applications where microglass contamination of a filtered liquid or gas may be a hazard. However, in a filtration structure in accordance with the present invention, microfiber may beneficially bind to the fibrous matrix at more than one point, minimizing individual fiber migration. Generally speaking, any microfiber of significantly smaller diameter, typically, about an order of magnitude smaller, compared to the diameter of the structural component of the bicomponent fiber, and suitable for bonding to the bicomponent fiber matrix, may be used. Thus, it may be understood that a filtration structure in accordance with the present invention, may be a heterofiber matrix that relies upon a thick fiber for structure and a thin fiber for pore size control.

A minor percentage of the microfiber will typically be used, generally up to about 35 wt. % but less than about 50 wt. %, suitably from about 0.1 to 25 wt. %, depending upon the particular application, for example, the filtration efficiency desired. For practical purposes, the least amount of the microfiber will generally be used as is consistent with obtaining the desired filtration efficiency. In any event, the amount of the microfiber will be considerably less than is necessitated for a conventional high efficiency filter made from microfiber alone.

A filtration structure in accordance with the present invention, is beneficially wet laid. A wet lay process is advantageous for forming a generally uniform web, and is particularly advantageous for obtaining a generally uniform dispersion of fibers of significantly different diameters.

In forming a generally uniform dispersion of the fibers in a water carrier medium, a whitewater system of water, dispersing agent, and viscosity modifier may be beneficially used. A viscosity modifier that increases the viscosity of the water carrier medium, will generally be selected. A dispersant that beneficially aids fiber interaction with the water carrier medium to assist in dispersion and acts to wet out the surface of the fibers, may typically be beneficially chosen. Also, pH adjustment of the water carrier medium may be advantageous. In addition, it may be advisable in some cases to use a suitable anti-foaming agent or other processing aids well known to those skilled in the art.

Various ingredients may be used as the viscosity modifier and dispersing agent, and it is not so important which additives are chosen, but rather that a generally uniform dispersion of fibers in the furnish is produced. Also, the dispersion will advantageously be sufficiently stable that a web laid from the dispersion is generally uniform and free of aggregated or clumped fibers.

Suitability of or need for a particular additive agent will depend upon the fibers selected. In some cases, for example when a glass microfiber is used, adjusting the furnish to an acidic pH, for example to a pH of about 2, may be beneficial. In any event, it is within the expertise of one skilled in the art to select an appropriate additive or to use a suitable technique to provide a generally uniform dispersion of fibers and to provide the dispersion with adequate stability.

Useful viscosity modifiers include nonionic associative thickeners, for example, relatively low (10,000–200,000) molecular weight, ethylene oxide-based, urethane block copolymers. Commercial formulations of these copolymers are available under the trade name ACRYSOL from Rohm and Haas, Philadelphia, Pa. Similar copolymers are commercially available from other sources. Other useful thickeners include modified polyacrylamides available from Nalco Chemical Company, such as Nalco 7588.

Useful viscosity modifiers also include synthetic, long chain, linear molecules having an extremely high molecular weight, on the order of at least about 1 million and up to about 15 million, or 20 million, or even higher. Examples of such viscosity modifiers are polyethylene oxide which is a long chain, nonionic homopolymer and has an average molecular weight of from about 1 to 7 million or higher; polyacrylamide which is a long, straight chain, nonionic or slightly anionic homopolymer and has an average molecular weight of from about 1 million up to about 15 million or higher; acrylamide-acrylic acid copolymers which are long, straight chain, anionic polyelectrolytes in neutral and alkaline solutions, but nonionic under acid conditions, and possess an average molecular weight in the range of about 2 to 3 million, or higher; and polyamines which are long, straight chain, cationic polyelectrolytes and have a high molecular weight of from about 1 to 5 million or higher.

Useful dispersing agents include both hydrophobic and hydrophilic moieties, have excellent hydrogen bonding properties in water, and are commercially available. Selection will be based upon compatibility with the different fiber components and with other processing aids. A preferred dispersant may be an oxyalkylated fatty amine. Illustrative is an ethoxylated oleylamine commercially available from Nalco Chemical Company as NALCO L2755M. The dispersing agents may be deposited on and coat the fiber surface. This coating action may aid in deterring the formation of clumps, tangles and bundles.

The concentration of the dispersing agent in the furnish may be varied within relatively wide limits and may be as low as 1 ppm and up to as high as about 200 ppm. Higher concentrations up to about 600 ppm may be used but may be uneconomical and cause low wet web strength. However, if the aqueous medium and dispersing agent are recovered and reused, concentrations up to 1000 ppm or even higher, may be useful in some applications.

The concentration of the viscosity modifier in the furnish may likewise be varied within relatively wide limits. Concentrations may be from about 25 to 500 ppm, or in some cases as much as about 1%.

The concentration of the fibers in the furnish may also be varied within relatively wide limits. Concentrations as low as about 0.1 to 6.0 wt. % of the furnish, may be suitable. Lighter or heavier concentrations may be employed for special products intended for special purposes.

It has been found that bicomponent fiber having an activated copolyolefin sheath, and glass microfiber may be generally well co-dispersed in a furnish by separately dispersing the bicomponent fiber and microfiber, adding the dispersions to a sheet-forming device, and adjusting the pH of the furnish to the acidic side, for instance, a pH of about 2. To this end, the bicomponent fiber may be added with stirring to an aqueous medium containing a suitable dispersing agent, and after the addition of a useful thickener, the resulting mixture is suitably agitated; and glass microfiber may be added to an aqueous medium, the pH adjusted to the acidic side, and the resulting mixture sufficiently agitated. A good dispersion of the microfiber may often be more easily obtainable than for the bicomponent fiber. It may be beneficial for the order of addition to the sheet machine to be as follows: the bicomponent fiber dispersion, followed by additional thickener, and then the microfiber followed by the pH adjustment. The furnish is advantageously agitated.

It is believed that by so doing, the fibers enter a favorable aqueous environment which is immediately conducive to their maintaining their individuality with respect to each other whereby there is substantially no tendency to form clumps, tangles or bundles. By comparison, an unfavorable aqueous environment may cause the fibers to form clumps, tangles or bundles or to migrate either to the top or bottom of the furnish.

As a consequence, in the resulting wet laid, fibrous web, the matrix structure is generally uniform and microfiber is generally uniformly distributed throughout the bicomponent fiber matrix. Moreover, the fibrous structure is generally free of entangled fiber.

The wet laid, fibrous web is formed from the furnish in accordance with conventional procedures, and excess water is then beneficially removed from the web. Removal of excess water may be accomplished by applying a vacuum to the sheet-forming device.

Thereafter, the wet laid, fibrous web is dried at a temperature below the bonding temperature to remove moisture. Then, thermal bonding is effected to provide a self-bonded, fibrous web with microfibers locked into the web structure. To this end, in a continuous process, the nonwoven structure may be beneficially subjected to bonding in-line with through-air heating to keep the structure lofty. Compression or compaction of the matrix structure during thermal bonding should be avoided.

Thermal bonding is carried out at a sufficient elevated temperature less than the melting point of the structural fiber component and for a suitable period of time to melt the heat-bondable component and provide adequate flow for the heat-bondable component to act as an adhesive for bonding, upon cooling. The thermal bonding temperature may vary, with an appropriate elevated temperature depending upon the respective melting points of the bicomponent fiber components. For bicomponent fiber available under the registered trade mark CELBOND, an elevated temperature as low as about 110° C. up to about 230° C., may typically be used. Selection of a relatively higher temperature generally requires a relatively shorter exposure time, whereas selection of a relatively lower temperature usually requires a relatively longer exposure time. Treatment conditions that result in too much flow of the heat-bondable component or in structural degradation are to be avoided. The web is thereafter cooled to below the resolidification temperature of the heat-bondable component to form bonds.

Through-air bonding may be suitably effected by passing the wet laid web through a drying machine raised to an appropriate elevated temperature. A suitable machine for this purpose is a Honeycomb System Through-Air Dryer.

The filtration structure of the present invention may be made with a wide range of filtration efficiencies/porosities. The filtration structure may be provided in the form of sheets (rolls), bags, cartridges, canisters, corrugated sheet in framed structures and so forth, using conventional methods and machinery. Advantageously, high efficiency, HVAC or HEPA air filters or high efficiency, depth filters may be produced. The filtration structure may be from about 0.001 to 1" thick or, if laminated, several inches thick. Layered structures of different pore size may be constructed.

A support structure may be beneficial for some applications. The bicomponent fiber matrix or heterofiber matrix may be physically supported by, or laminated to, the support structure. The support structure may be an underlying metallic or plastic screen, or may be an underlying woven, knit or non-woven fabric structure.

Preparation and Evaluation of Filtration Structures

A heterofiber matrix having microfiber locked into the structural matrix is prepared as now described. A bicomponent fiber (1.85 g, 80 wt. %;) of about 15 microns diameter and commercially available under the registered trade mark CELBOND® (Type 105), and glass microfiber (0.46 g, 20 wt. %) of 0.8 micron diameter and available from Evanite Glass Fiber Inc. (Type 606) are weighed out. The particular bicomponent fiber has a substantially concentric, sheath/core configuration, with the core having a diameter of about 10 microns and being polyethylene terephthalate, and the sheath being an activated copolyolefin which is a 90/10 blend of LLDPE and grafted HDPE having a melting point of 127° C., a density of 0.932 g/cc and a melt flow value of 16 gm/10 min at 190° C. The grafted HDPE contains 1 wt. % succinic anhydride groups. The bicomponent fiber is a short cut fiber of 13 mm length, and the glass microfiber has a variable length of about 20 to 650 microns, with a substantial concentration of the microfiber having a length greater than about 150 microns.

The microfiber is added to a Waring blender partially filled (about ⅔ full) with tap water, and the mixture is adjusted to pH 2 by the use of sufficient concentrated sulfuric acid. The fiber is dispersed by mixing at maximum speed for one minute. The bicomponent fiber is added with stirring to another Waring blender partially filled (about ⅔ full) with water containing 10 drops of a dispersing agent (Nalco L-2755M). 0.5 ml of a viscosity modifier (Nalco 7588) is added, and the bicomponent fiber is dispersed by mixing at medium speed for three minutes.

Immediately after forming the fiber dispersions, the bicomponent fiber dispersion is added to a Williams Apparatus Company Sheet Machine (total volume about 16 liters) about ⅓ full of water, from which bubbles trapped in the lower portion of the apparatus have been released. 0.5 ml of the viscosity modifier is added with stirring to the slurry, followed by the microfiber dispersion. Thereafter, the furnish is adjusted to pH 2 with sulfuric acid, and is lightly agitated. Water is added to fill the apparatus while the furnish is lightly agitated.

Thereafter, a vacuum is applied to draw the water through a screen at the bottom of the apparatus, forming a nonwoven web. Additional residual water is vacuumed off the web. The handsheet is dried at 100° C. on a hot plate until moisture evolution as indicated by steam release, ceases. Thereafter, the handsheet is laid against a supporting screen in a forced air, recirculating oven at 130° C. for 2 minutes to bond the structure.

The process is repeated with variation in the proportions of bicomponent fiber and glass microfiber, to obtain handsheets varying in percentage of microfiber (0%, 5%, 11%). The microfiber is generally uniformly distributed throughout the structural matrix.

Figure 2:
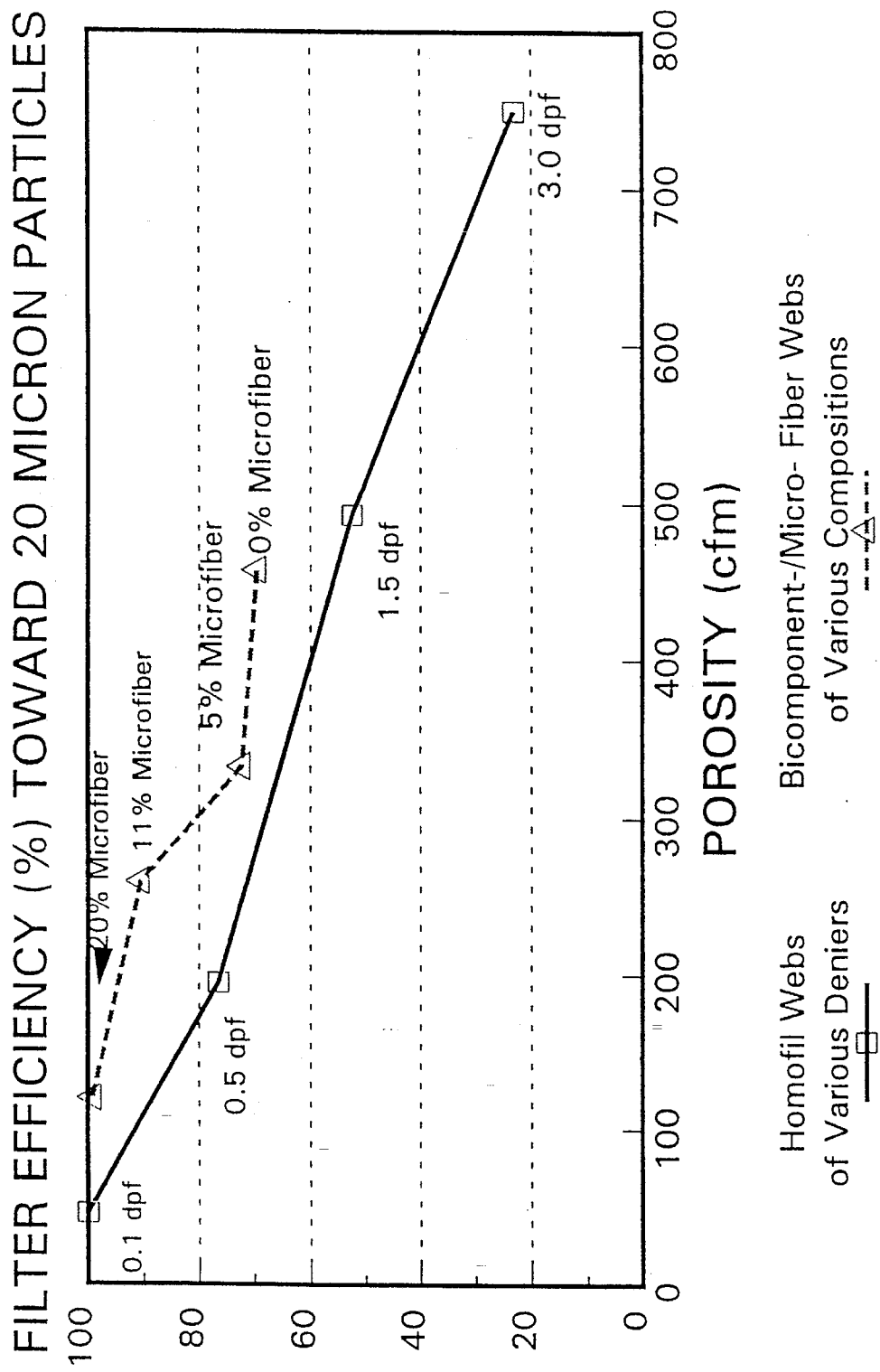
Figure 3:
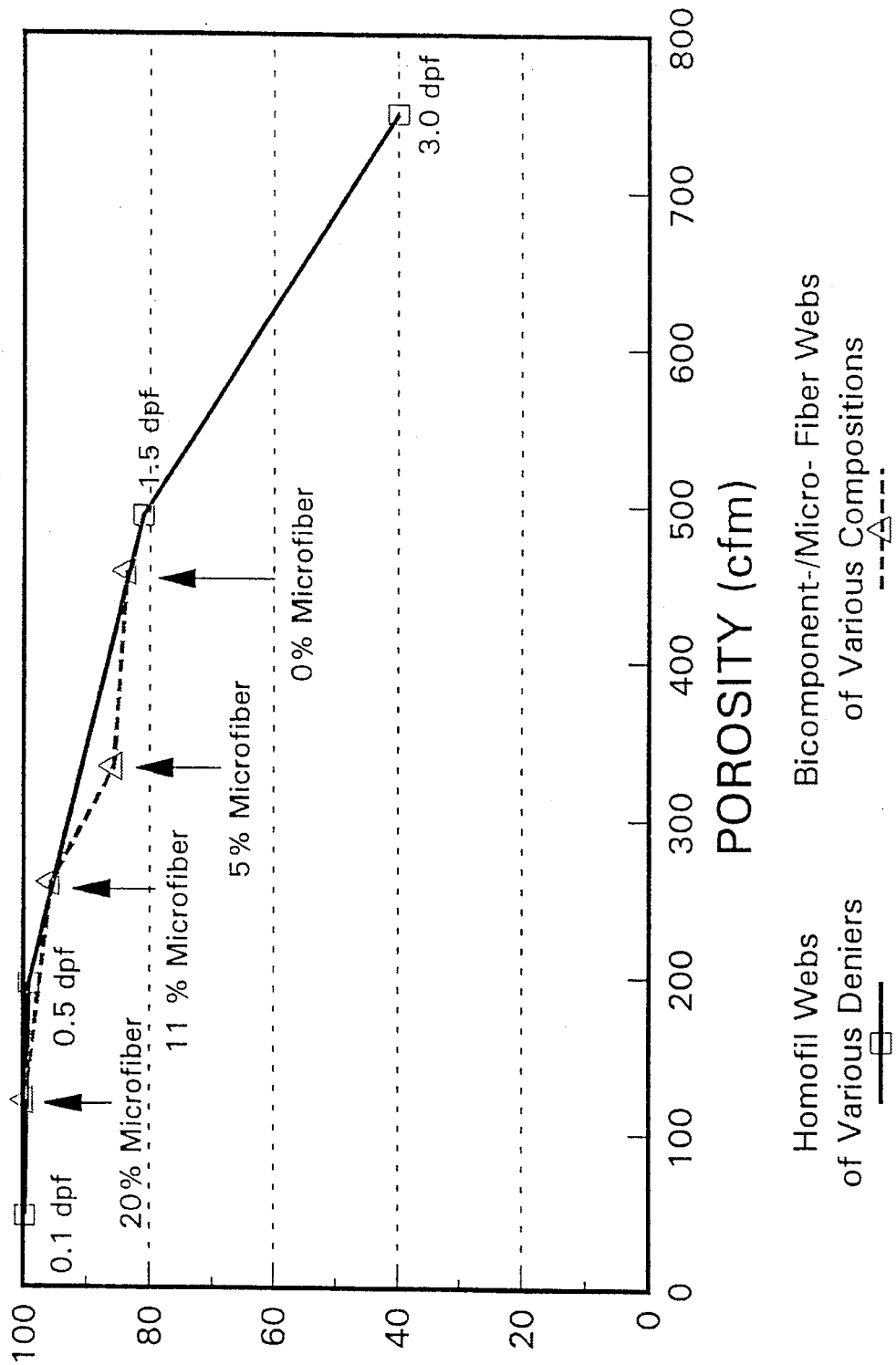

The handsheets are evaluated for porosity (cfm) and filter efficiency (%) using test procedures allowing comparison with the homofil web data of FIGS. 1–3. Porosity is measured on a Frasier Permeometer, and filter efficiency is measured as single pass retention efficiency with SAE coarse test dust L/N 4375C, in water at 100 cc/min flow rate. The homofil web data is taken from the earlier referenced, *Filtration News* article, and is based on conventional filters made from single denier, polyester fibers ranging from 0.1 to 15 denier, bonded by conventional means. All filters have 50 g/cm$^2$ basis weight. Particulates of 10, 20 and 30 micron are passed through the handsheets. The results are plotted in the Figures.

Figure 4:
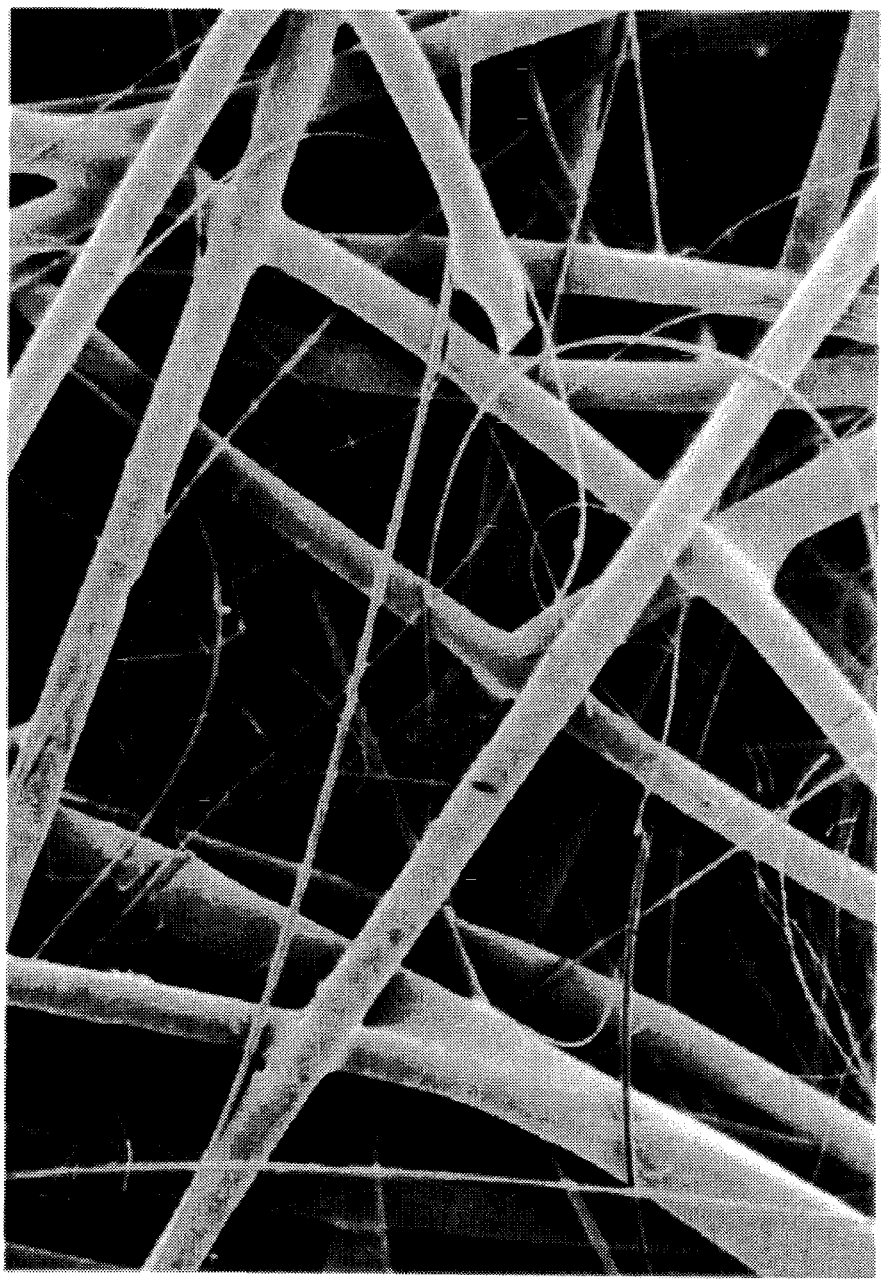
FIG. 4 is an SEM photomicrograph of a heterofiber matrix, filtration structure in accordance with the present invention.

FIGS. 1–3 show filter efficiency increases as porosity decreases with increasing levels of microfiber, and show the ability to customize to a desired filtration efficiency by merely changing the level of microfiber. A substantially improved ratio of filtration efficiency to porosity compared to homofil webs, is demonstrated toward fine particles, especially 10 micron particles (FIG. 1), for both filtration structures consisting of bicomponent fiber and filtration structures including microfiber. Particularly noticeable is the lower pressure drop at 99.9% filter efficiency. As indicated by FIGS. 2 and 3, differences decrease for larger particles on the order of 20 to 30 microns. FIG. 4 is an SEM photomicrograph of a heterofiber matrix, filtration structure in accordance with the present invention.

The present invention may be carried out with various modifications without departing from the spirit or essential attributes thereof, and accordingly, reference should be made to the appended claims, rather than to the foregoing specification as indicating the scope of the invention.

We claim:

1. A filtration structure comprising a thermally bonded, wet laid, fibrous web, and a suitable filtration support structure; said fibrous web being formed from bicomponent fiber comprising a web structure-forming core component and a heat-bondable sheath component.

2. The filtration structure of claim 1, wherein said support structure is an underlying support structure.

3. The filtration structure of claim 1, wherein said web structure-forming core component is a polyester, and said heat-bondable sheath component is a suitable blend of LLDPE and grafted HDPE.

4. A filtration method comprising passing a particulate-containing fluid through a thermally bonded, wet laid fibrous web formed from bicomponent fiber comprising a web structure forming core component and a heat-bondable sheath component; said wet laid, fibrous web is supported on a suitable filtration support structure.

5. A filtration structure comprising a thermally bonded, wet laid, heterofiber matrix, said heterofiber matrix being formed from bicomponent fiber comprising a structure-forming core component and a heat-bondable sheath component, and from microfiber having a diameter of less than about 2 microns; said wet laid heterofiber matrix is supported on a suitable filtration support.

6. The filtration structure of claim 5, wherein said microfiber is fiberglass.

7. The filtration structure of claim 5, wherein said structure-forming core component is a polyester, and said heat-bondable sheath component is a suitable blend of LLDPE and grafted HDPE.

* * * * *